US008371600B2

(12) United States Patent  
Büttner

(10) Patent No.: US 8,371,600 B2
(45) Date of Patent: Feb. 12, 2013

(54) FIFTH WHEEL WITH ANTI-THEFT PROTECTION DEVICE

(75) Inventor: Siegfried Büttner, Singen (DE)

(73) Assignee: SAF-HOLLAND Verkehrstechnik GmbH, Singen-Hohentwiel (DE)

( * ) Notice: Subject to any disclaimer, the term of this patent is extended or adjusted under 35 U.S.C. 154(b) by 522 days.

(21) Appl. No.: 10/558,004

(22) PCT Filed: Jul. 16, 2004

(86) PCT No.: PCT/EP2004/007908
§ 371 (c)(1),
(2), (4) Date: Nov. 22, 2005

(87) PCT Pub. No.: WO2005/028290
PCT Pub. Date: Mar. 31, 2005

(65) Prior Publication Data
US 2006/0290099 A1 Dec. 28, 2006

(30) Foreign Application Priority Data

Sep. 3, 2003 (DE) .................................. 103 41 019

(51) Int. Cl.
*B62D 53/08* (2006.01)
(52) U.S. Cl. ........................................ 280/433; 280/507
(58) Field of Classification Search .................. 280/507, 280/433, 422, 434
See application file for complete search history.

(56) References Cited

U.S. PATENT DOCUMENTS

| 2,387,625 | A | * | 10/1945 | Walther et al. | ................ 340/431 |
| 2,850,292 | A | * | 9/1958 | Holland | ........................ 280/434 |
| 3,117,803 | A | * | 1/1964 | Saewert | ........................ 280/433 |
| 3,484,124 | A | * | 12/1969 | Wille | ................................ 403/14 |
| 3,535,679 | A | * | 10/1970 | Connors | ........................ 340/431 |
| 3,584,899 | A | * | 6/1971 | Gottler et al. | ................. 280/407 |
| 3,697,974 | A | * | 10/1972 | Harris | ............................ 340/431 |
| 3,876,239 | A | * | 4/1975 | Jackson et al. | ................. 280/432 |
| 4,065,149 | A | * | 12/1977 | Roth | ................................. 280/432 |
| 4,106,793 | A | * | 8/1978 | Neff | ................................. 280/435 |
| 4,119,330 | A | * | 10/1978 | Capps | ........................... 280/432 |
| 4,205,300 | A | * | 5/1980 | Ho et al. | ........................ 340/429 |
| 4,838,570 | A | * | 6/1989 | Toikka et al. | ................. 280/507 |
| 4,907,815 | A | * | 3/1990 | Hunger | .......................... 280/435 |
| 4,928,987 | A | * | 5/1990 | Hunger | .......................... 280/435 |
| 5,028,067 | A | * | 7/1991 | Madura | ........................ 280/433 |
| 5,069,472 | A | * | 12/1991 | Parr et al. | ...................... 280/433 |

(Continued)

FOREIGN PATENT DOCUMENTS

| BR | PI 9901143-3 A | 10/2000 |
| DE | 195 16 101 | 11/1996 |

(Continued)

*Primary Examiner* — Tashiana Adams
*Assistant Examiner* — Maurice Williams
(74) *Attorney, Agent, or Firm* — Price Heneveld LLP

(57) ABSTRACT

A fifth wheel comprising a coupling plate and an anti-theft protection device, the anti-theft protection device being configured such that it is integrally connected to the coupling plate and can be electrically actuated and the anti-theft protection device being arranged such that it is not discernible from the outside.

7 Claims, 2 Drawing Sheets

U.S. PATENT DOCUMENTS

| | | | |
|---|---|---|---|
| 5,477,207 A * | 12/1995 | Frame et al. | 340/431 |
| 5,516,138 A * | 5/1996 | Fontaine | 280/434 |
| 5,861,802 A * | 1/1999 | Hungerink et al. | 340/431 |
| 5,876,055 A * | 3/1999 | Fontaine | 280/437 |
| 6,483,276 B1 * | 11/2002 | Shimizu et al. | 322/24 |
| 6,592,230 B2 * | 7/2003 | Dupay | 359/839 |
| 6,709,001 B1 * | 3/2004 | Morgan et al. | 280/421 |
| 7,182,362 B2 * | 2/2007 | Yeakel | 280/433 |
| 2001/0050509 A1 * | 12/2001 | Holt | 303/89 |
| 2002/0067025 A1 * | 6/2002 | Gisinger et al. | 280/433 |
| 2004/0145150 A1 * | 7/2004 | Yeakel | 280/433 |
| 2005/0140171 A1 * | 6/2005 | Crean | 296/156 |

FOREIGN PATENT DOCUMENTS

| | | |
|---|---|---|
| DE | 19516101 | 11/1996 |
| DE | 198 40 007 | 3/2000 |
| DE | 101 59 503 | 6/2003 |
| DE | 10159503 | 6/2003 |
| EP | 0 051 464 | 5/1982 |
| EP | 0 706 918 | 4/1996 |
| WO | 03/043838 | 5/2003 |

* cited by examiner

FIFTH WHEEL WITH ANTI-THEFT PROTECTION DEVICE

BACKGROUND OF THE INVENTION

The invention relates to a fifth wheel comprising a coupling plate and an anti-theft protection device.

In automobile construction, fifth wheels are used to connect a truck tractor to a trailer to form a truck-tractor combination. The fifth wheel consists of a coupling plate on the tractor and a kingpin on the trailer. In the coupling plate there is made a receiving opening for receiving the kingpin. In the coupled-up state, the kingpin is detachably secured in the receiving opening by a locking mechanism. The locking mechanism is locked for increased safety in traffic and the locking is monitored with displays in the vehicle cab. In recent years, laden truck-tractor combinations and those which are parked in the coupled-up state have increasingly been stolen. The mechanical locking is forcefully broken open, the coupling is decoupled and the trailer is illegally hauled away with a third-party tractor.

From DE 19516101 A1, an anti-theft protection device for a coupled-up semitrailer is known. The anti-theft protection device consists of a ram, which acts counter to a spring force in a tubular body upon the locking mechanism beneath the coupling plate and can be closed off with a cylinder lock and actuated manually. The cylinder lock can be viewed from the outside and the location of the anti-theft protection device is discernible.

The object of the invention is to define a fifth wheel having an anti-theft protection device which is automatically lockable and which can be destroyed only with a relatively high time expenditure.

SUMMARY OF THE INVENTION

The object is achieved by a fifth wheel comprising a coupling plate and an anti-theft protection device, the anti-theft protection device being configured such that it is integrally connected to the coupling plate and can be electrically actuated and the anti-theft protection device being arranged such that it is not discernible from the outside.

It is advantageous that the location of the anti-theft protection device is not visible from the outside. This is achieved by the fact that the anti-theft protection device is disposed in a housing beneath the coupling plate. This is achieved by the fact that the housing is formed from a casting with the coupling plate.

It is also advantageous that no key is necessary to operate the anti-theft protection device. From the outside, no locking cylinder can be seen and it is not easy to tell whether and where an anti-theft protection device has been fitted. This is achieved by the fact that the locking part is configured so as to interact with an electromagnet.

Furthermore, it is also advantageous that the operation of the anti-theft protection device is as simple as possible. This is achieved by the fact that the electromagnet is arranged such that it is connectable to a control unit in the driver's cab of a tractor. This is also achieved by the fact that the electromagnet is configured such that it can be electrically actuated by the inputting of a numerical code at the control unit.

BRIEF DESCRIPTION OF THE DRAWINGS

An illustrative embodiment of the invention is described with reference to the Figures, in which.

DETAILED DESCRIPTION

Figure 1:
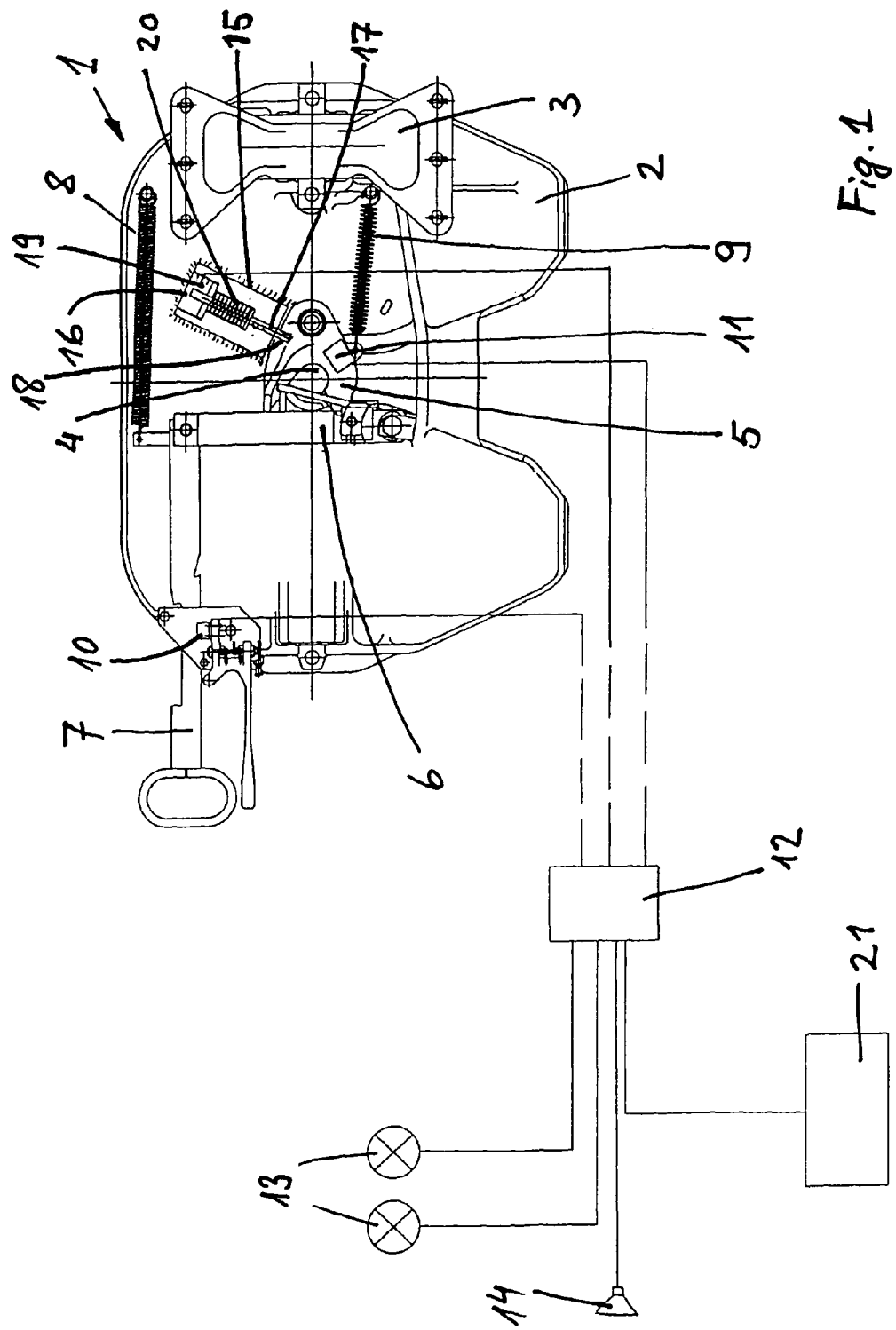
FIG. 1 shows a view of a fifth wheel according to the invention, with anti-theft protection device and control unit.

In FIG. 1, a fifth wheel 1 with an anti-theft protection device 16 is shown in diagrammatic representation. FIG. 1 shows a coupling plate 2 of a truck-tractor combination (not represented) in a view from below. The coupling plate 1 is connected on the tractor by means of bearing brackets 3 (of which only one is represented here) and bearing shells, such that it has some limited freedom of movement. In the middle of the coupling plate 2, a receiving opening 4 for a kingpin (not represented) of a trailer can be seen.

The kingpin is secured in the receiving opening 4 by a locking mechanism 5, 6, consisting essentially of a movable lock part 5 and a movable bolt part 6. The bolt part 6 can be actuated by a hand lever 7. The bolt part 6 and the lock part 5 are held in the closing position by tension springs 8, 9.

The fifth wheel 1 additionally has sensors 10, 11 for monitoring the position of the hand lever 7 and of the lock part 5. The sensors 10, 11 are connected by electric leads to a control unit 12. Disposed in the driver's cab are signal transmitters, which inform the driver about the signals from the control unit 12. The signal transmitters can be configured as visual displays 13 and/or acoustic warning signal transmitters 14.

On the bottom side of the coupling plate 2, a housing 15 is represented. The housing 15 can be made in a casting with the coupling plate 2 or, for retrofitting with existing coupling plates, can be welded to the coupling plate 2 at the bottom. In the housing 15 there is disposed the anti-theft protection device 16 according to the invention. Projecting from the housing 15 is a locking part 17, which, with the projecting region, is received in a well-fitting manner in a cavity 18 on the lock part 5.

The locking part can be configured, for example, as a pin 17, a claw or a hook. In the housing 15, there are additionally disposed a compression spring 20 and an electromagnet 19. In the currentless state of the anti-theft protection device 16, the spring 20 causes the pin 17 to be forced from the housing 15 into the cavity 18 on the lock part 5. In response to an electrical pulse from the control unit 12, the electromagnet 19 causes the pin 17 to be drawn out of the cavity 18. The housing 15 and, in particular, the pin 17 are disposed in such a way adjacent to the lock part 5 that the anti-theft protection device 16, at least in the closed state of the fifth wheel 1, forms a homogenous unit with the lock part 5 and thus offers no points of application for a break-in tool.

Also connected to the control unit 12 is a coder 21. In the coder 21, a numerical code is inputted and compared with a stored, predefined value. If these tally, the control unit 12 will transmit an electrical pulse for actuation of the electromagnet 19 and the pin 17 is released by the attraction force of the electromagnet 19. The numerical code or a part thereof can also be disclosed, instead of to the driver, only to the consignee at the place of destination of the truck tractor. This prevents the driver from being able, in transit, to disconnect the anti-theft protection device 16 in the event of a raid. The acoustic warning indicator 14 and the signal lamps or visual displays 13 provide the driver with all necessary information about the functioning of the anti-theft protection device 16 and, where appropriate, also about an attempted theft.

Figure 2:
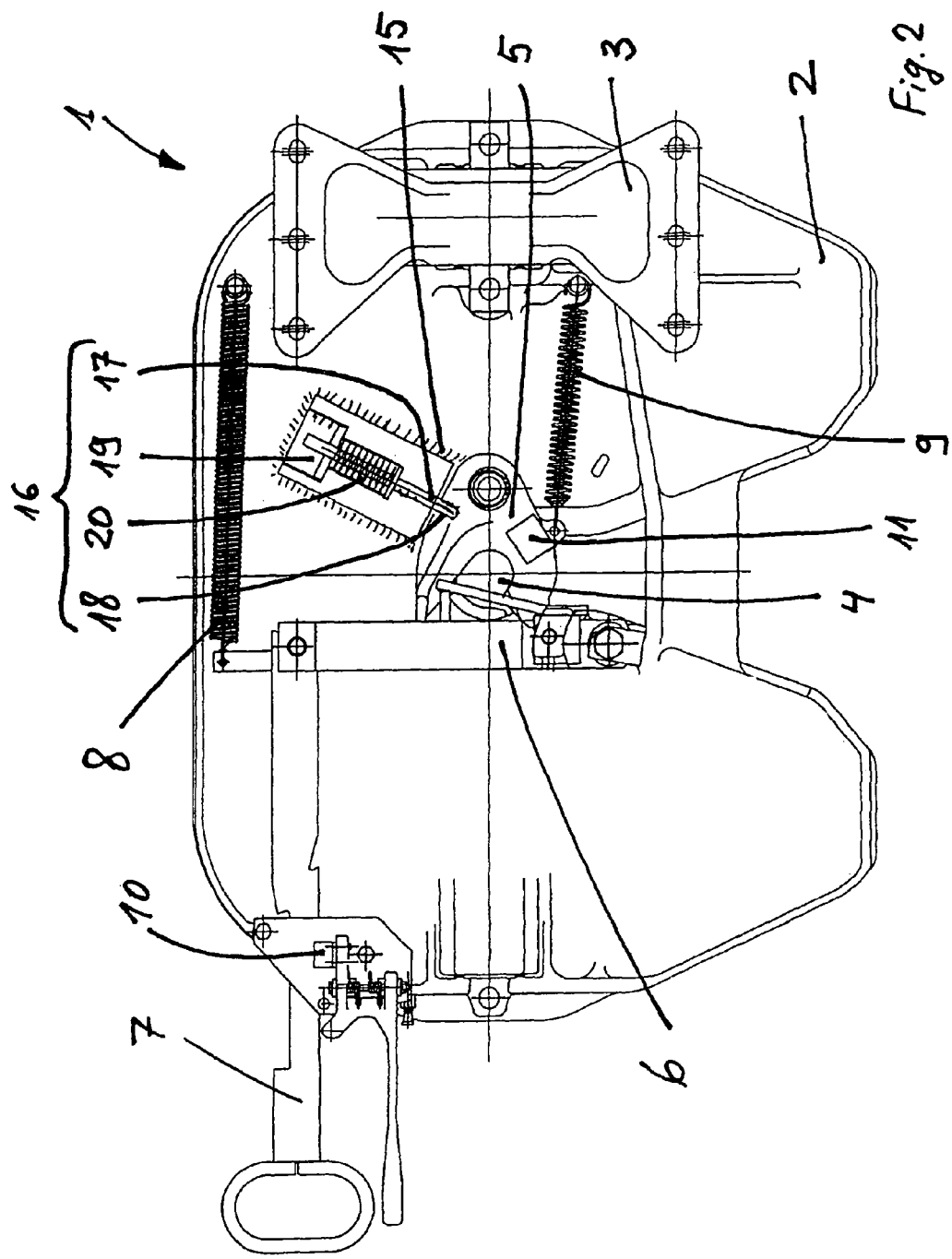
FIG. 2 shows a view of the fifth wheel of FIG. 1.

In FIG. 2, the fifth wheel 1 of FIG. 1 is represented in isolation, i.e. without electric leads and electrical equipment. The same reference symbols relate to the same features. The housing 15 can also be configured elsewhere on the coupling plate 2, for example such that, in place of the lock part 5, the bolt part 6 or both parts 5, 6 is or are additionally secured with the anti-theft protection device 16.

With the anti-theft protection device 16 which has here been proposed, the fifth wheel 1 is protected from unauthorized tampering. The anti-theft protection device 16 is not discernible from the outside and, because it is accommodated in a housing 15 as an integral part of the coupling plate 2, offers a longer-lasting protection against break-in attempts than does a locking cylinder which is visible from the outside. As a result of this fifth wheel with electrical anti-theft protection device, a mechanical release of the connection between tractor and trailer of a truck-tractor combination is virtually no longer possible.

The invention claimed is:

1. A truck tractor-trailer combination comprising a fifth wheel to connect a truck tractor to a trailer, the fifth wheel comprises a coupling plate on the tractor and a kingpin on the trailer, the coupling plate includes an opening for receiving the kingpin, a locking mechanism for detachably securing the kingpin in the opening of the coupling plate, a driver's cab on the truck tractor, and an anti-theft protection device which comprises elements different from those of the locking mechanism is disposed in a housing which is integrally connected to and beneath the coupling plate, the anti-theft protection device is arranged in the housing such that it is not discernible from the outside, wherein the anti-theft protection device is configured to be electrically actuated, the anti-theft protection device comprises a locking part which projects from the housing and which is configured such that it fits a receiving fixture in a lock part of the fifth wheel, which is adapted to be actuated by a bolt part from a first position, wherein the kingpin may be removed from the opening of the coupling plate, and a second position, wherein the lock part provides a mechanical locking of the kingpin within the opening of the coupling plate, and further includes a control unit in the driver's cab for unlocking the anti-theft protection device, wherein the housing and the coupling plate comprises a cast structure, and wherein the housing is rigidly fixed to the coupling plate.

2. The fifth wheel as claimed in claim 1, wherein the locking part of the anti-theft protection device is activated and deactivated with an electromagnet.

3. The fifth wheel as claimed in claim 2, wherein the electromagnet controlled by the control unit in the driver's cab of a truck.

4. The fifth wheel as claimed in claim 3, wherein the electromagnet includes a numerical code input for activating and deactivating the control unit at the control unit.

5. The fifth wheel as claimed in claim 3, further including sensors and displays for monitoring the fifth wheel, said sensors and displays are electrically connected to the control unit.

6. A truck tractor-trailer combination comprising a fifth wheel to connect a truck tractor to a trailer, the fifth wheel comprises a coupling plate on the tractor and a kingpin on the trailer, the coupling plate includes an opening for receiving the kingpin, a locking mechanism for detachably securing the kingpin in the opening of the coupling plate, a driver's cab on the truck tractor, and an anti-theft protection device which comprises elements different from those of the locking mechanism is disposed in a housing which is integrally connected to and beneath the coupling plate, the anti-theft protection device is arranged in the housing such that it is not discernible from the outside, wherein the anti-theft protection device is configured to be electrically actuated, the anti-theft protection device comprises a locking part which projects from the housing and which is configured such that it fits a receiving fixture in a lock part of the fifth wheel, which is adapted to be actuated by a bolt part from a first position, wherein the kingpin may be removed from the opening of the coupling plate, and a second position, wherein the lock part provides a mechanical locking of the kingpin within the opening of the coupling plate, and further includes a control unit in the driver's cab for unlocking the anti-theft protection device, wherein the housing and the coupling plate comprises a welded structure, and wherein the housing is rigidly fixed to the coupling plate.

7. A truck tractor-trailer combination comprising a fifth wheel to connect a truck tractor to a trailer, the fifth wheel comprises a coupling plate on the tractor and a kingpin on the trailer, the coupling plate includes an opening for receiving the kingpin, a locking mechanism for detachably securing the kingpin in the opening of the coupling plate, a driver's cab on the truck tractor, and an anti-theft protection device which comprises elements different from those of the locking mechanism is disposed in a housing which is integrally connected to and beneath the coupling plate, the anti-theft protection device is arranged in the housing such that it is not discernible from the outside, wherein the anti-theft protection device is configured to be electrically actuated, the anti-theft protection device comprises a locking part which projects from the housing and which is configured such that it fits a receiving fixture in a lock part of the fifth wheel, which is adapted to be actuated by a bolt part from a first position, wherein the kingpin may be removed from the opening of the coupling plate, and a second position, wherein the lock part provides a mechanical locking of the kingpin within the opening of the coupling plate, and further includes a control unit in the driver's cab for unlocking the anti-theft protection device, and wherein the housing is rigidly fixed to the coupling plate.

* * * * *